(12) United States Patent
Chung et al.

(10) Patent No.: US 9,983,422 B2
(45) Date of Patent: May 29, 2018

(54) LCD PANEL AND LCD AND VIEWING ANGLE CONTROL METHOD OF LCD PANEL

(71) Applicant: Infovision Optoelectronics(Kunshan) Co., Ltd., Kunshan, Jiangsu Province (CN)

(72) Inventors: Te-Chen Chung, Kunshan (CN); Zifang Su, Kunshan (CN); Mengqing Zhu, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 94 days.

(21) Appl. No.: 15/158,599

(22) Filed: May 19, 2016

(65) Prior Publication Data
US 2016/0341987 A1    Nov. 24, 2016

(30) Foreign Application Priority Data
May 22, 2015  (CN) .......................... 2015 1 0266784

(51) Int. Cl.
G02F 1/1343   (2006.01)
G02F 1/13     (2006.01)

(52) U.S. Cl.
CPC ...... *G02F 1/1323* (2013.01); *G02F 1/134363* (2013.01); *G02F 2001/134381* (2013.01)

(58) Field of Classification Search
CPC ......... G02F 1/133707; G02F 1/134336; G02F 2001/134345; G02F 1/1393; G02F 2201/128; G02F 1/1323; G02F 1/134363; G02F 2001/134381; G02F 1/136213; G02F 1/133753; G02F 1/1343; G02F 1/133514
See application file for complete search history.

(56) References Cited

U.S. PATENT DOCUMENTS 8,830,433 B2    9/2014 Heo et al.
2006/0267905 A1* 11/2006 Nishino ................ G02F 1/1323
                                                      345/98

(Continued)

FOREIGN PATENT DOCUMENTS

CN    101201479 A    6/2008
CN    102854670 A    1/2013
(Continued)

*Primary Examiner* — Huyen Ngo
(74) *Attorney, Agent, or Firm* — Cheng-Ju Chiang

(57) ABSTRACT

An LCD panel includes a first substrate, a second substrate, and a liquid crystal layer. The first substrate is provided with a first electrode thereon. The first electrode is provided with a plurality of stripe-like control electrodes for controlling a viewing angle of the LCD panel. The second substrate is provided with a second electrode and a third electrode thereon. The second electrode is a common electrode for inputting a common voltage to the LCD panel. The third electrode is a pixel electrode formed in each pixel of the LCD panel. When no bias voltage is applied to the stripe-like control electrodes of the first electrode, the LCD panel is displayed with a wide viewing angle; and when a bias voltage is applied to the stripe-like control electrodes of the first electrode, the LCD panel is displayed with a narrow viewing angle.

20 Claims, 6 Drawing Sheets

(56) References Cited

U.S. PATENT DOCUMENTS

| | | | |
|---|---|---|---|
| 2007/0002192 A1* | 1/2007 | Nishino | G02F 1/13338 349/12 |
| 2007/0146608 A1* | 6/2007 | Jin | G02F 1/133514 349/143 |
| 2010/0128208 A1* | 5/2010 | Kurasawa | G02F 1/1323 349/106 |
| 2014/0002761 A1 | 1/2014 | Heo et al. | |
| 2016/0246138 A1* | 8/2016 | Tang | G02F 1/133711 |

FOREIGN PATENT DOCUMENTS

| | | |
|---|---|---|
| CN | 202677032 U | 1/2013 |
| CN | 203773201 U | 8/2013 |
| CN | 104155808 A | 11/2014 |
| CN | 104360516 A | 2/2015 |
| CN | 104460138 A | 3/2015 |
| TW | 201329526 A1 | 7/2013 |

\* cited by examiner

LCD PANEL AND LCD AND VIEWING ANGLE CONTROL METHOD OF LCD PANEL

CROSS-REFERENCE TO RELATED APPLICATION

The present application is based on and claims priority of Chinese patent application No. 201510266784.7, filed on May 22, 2015. The entire disclosure of the above-identified application is hereby incorporated by reference herein and made a part of this specification.

TECHNICAL FIELD

The present application relates to liquid crystal display technology, and more particularly to a liquid crystal display (LCD), an LCD panel, and a viewing angle control method of the LCD panel.

BACKGROUND

Liquid crystal display (LCD) has many advantages, such as, light weight, energy saving, no radiation, and accordingly has gradually replaced traditional cathode ray tube (CRT) display. LCDs are widely used in high-definition digital televisions, desktop computers, personal digital assistants (PDA), notebook computers, mobile phones, digital cameras, and other electronic devices. An LCD typically includes a backlight module and an LCD panel disposed above the backlight module.

Wide viewing angle is the mainstream development of an LCD. Presently, portable electronic devices such as notebook computers, personal digital assistants, tablet PCs, mobile phones are adopted with wide viewing angle technology, so that users can see the display images on the LCD without distortion when viewed from different viewing angles. However, when using the portable electronic device in public places, the wide viewing angle design of conventional LCD cannot effectively protect the privacy of the user, and the images displayed on the LCD can be easily viewed by a bystander in a squint direction. Therefore, in addition to the needs for a wide viewing angle, LCDs capable of being adjusted to a narrow viewing angle are thus developed in order to protect modern people's needs of privacy in public places.

Currently, there are mainly two ways to switch between a wide viewing angle and a narrow viewing angle in an LCD. One way is to use a louver shielding film to cover the screen so as to reduce the angle of view in the need for protecting privacy. However, this way needs preparation of an additional louver covering film, causing great inconvenience to the user. One louver covering film can only achieve a fixed viewing angle. Once a louver covering film is attached to the screen, then the viewing angle of the screen is fixed and cannot change according to requirement of the user. The other way is to provide a dual light source backlight system in the LCD to adjust the angle of view. The dual light source backlight system consists of two layers of laminated light guide plates in combination with an anti-prism lens, the top light guide plate (LGP-T) combined with the anti-prism lens is used to change the direction of lights and restrict the lights in a relatively narrow range to obtain a narrow viewing angle in the LCD, while the bottom light guide plate (LGP-B) combined with the function of the anti-prism lens is used to obtain a wide viewing angle in the LCD. However, the dual light source backlight system will cause the thickness and the cost of the LCD to increase remarkably, which is not in line with the development trend of light weight, compactness and slimness of the LCD.

SUMMARY

The present application provides an LCD panel with switchable viewing angle, the LCD panel can switch between a wide viewing angle and a narrow viewing angle when it is required, without the need to use a louver shielding film or provide a dual light source backlight system in LCD, and without increasing the thickness and the cost of the LCD.

In one aspect, an LCD panel with switchable viewing angle is provided. The LCD panel includes a first substrate, a second substrate, and a liquid crystal layer sealed between the first substrate and the second substrate. The first substrate is provided with a first electrode thereon. The first electrode is provided with a plurality of stripe-like control electrodes for controlling a viewing angle of the LCD panel. The second substrate is provided with a second electrode and a third electrode thereon. The second electrode is a common electrode for inputting a common voltage to the LCD panel. The third electrode is a pixel electrode formed in each pixel of the LCD panel.

By applying a bias voltage to the stripe-like control electrodes of the first electrode or not, the viewing angle of the LCD panel is effectively controlled. When no bias voltage is applied to the stripe-like control electrodes of the first electrode, there is no light leakage in the particular areas corresponding to the stripe-like control electrodes, and the LCD panel can achieve a wide viewing angle. When a bias voltage is applied to the stripe-like control electrodes of the first electrode, a vertical electric field along the vertical direction is generated between the first substrate and the second substrate in particular areas corresponding to the stripe-like control electrodes to cause the liquid crystal molecules therein to rotate. As the liquid crystal molecules under the respective stripe-like control electrodes are rotated, the transmission path of the light in the areas corresponding to the stripe-like control electrodes is changed, and therefore a light leakage near the respective stripe-like control electrodes is resulted. As a result, the viewing angle of the LCD panel is reduced to achieve a narrow viewing angle.

In another aspect, a method of controlling a viewing angle of the LCD panel is provided. The method includes the steps: when the LCD panel is required to display with a wide viewing angle, applying no bias voltage to the stripe-like control electrodes of the first electrode; and when the LCD panel is required to display with a narrow viewing angle, applying a bias voltage to the stripe-like control electrodes of the first electrode. The bias voltage applied to the stripe-like control electrodes of the first electrode may be in the range of 0V to 4V.

Therefore, the viewing angle of the LCD panel can be easily controlled by controlling the bias voltage applied to the stripe-like control electrodes. The LCD panel can switch between a wide viewing angle and a narrow viewing angle by simply applying a bias voltage to the stripe-like control electrodes of the first electrode to meet the requirement of protecting privacy in public places. It is not required to use a louver shielding film or to provide a dual light source backlight system in LCD, without increasing the thickness and the cost of the LCD and having the advantages of easy operation and good flexibility.

Other novel features and advantages will become more apparent from the following detailed description when taken in conjunction with the accompanying drawings.

DETAILED DESCRIPTION OF PREFERRED EMBODIMENTS

Exemplary embodiments of the present application are described in detail with reference to the accompanying drawings, but the present application is not limited to the following embodiments.

Figure 1:
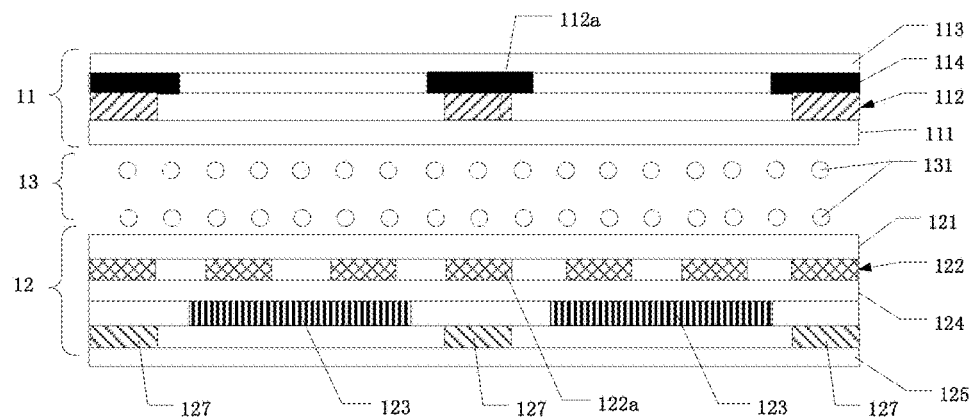
FIG. 1 schematically shows a sectional view of an LCD panel according to a first embodiment of the present application.

FIG. 1 schematically shows a sectional view of an LCD panel according to a first embodiment of the present application. In order for clarity, only a portion of the LCD panel is shown. Referring to FIG. 1, the present application provides a liquid crystal display (LCD) panel with switchable viewing angle. The LCD panel includes a first substrate 11, a second substrate 12 disposed opposite to the first substrate 11, and a liquid crystal layer 13 sealed between the first substrate 11 and the second substrate 12.

Generally, when a user views an LCD from different viewing angles, the brightness of images may reduce as the viewing angle increases. For traditional twisted nematic (TN) type LCD, common electrode and pixel electrode are separately formed on two different substrates, the liquid crystal molecules rotate in a plane orthogonal to the substrates. However, a viewing angle of TN type LCD is narrow as the orientations of liquid crystal molecules adjacent to the surfaces of the two substrates are orthogonal with each other. In order to realize wide viewing angle, both in-plane switch (IPS) type LCD employing a horizontal electric field and fringe field switching (FFS) type LCD employing a fringe electric field have been developed. For IPS type LCD or FFS type LCD, common electrode and pixel electrode are both formed on the same substrate (e.g., the TFT array substrate), the liquid crystal molecules are rotated in a plane substantially in parallel to the substrate to obtain improved viewing angle.

The LCD panel of the present application is suitable for being applied in an FFS type LCD or an IPS type LCD in which the liquid crystal molecules rotate in a plane in parallel to the substrate when the LCD is displayed by rotation of the liquid crystal molecules under an electric field generated between the pixel electrode and the common electrode. In FIG. 1, the LCD panel is shown as an FFS type LCD panel by an example.

Specifically, the first substrate 11 may be a color filter substrate. The first substrate 11 may include a first transparent base (not shown), a first alignment film 111, a first electrode 112, a first polarizer 113, and a color filter layer (not shown). The first alignment film 111, the first electrode 112, the color filter layer and the first polarizer 113 are formed on the first transparent base. The first polarizer 113 is arranged on an outer surface of the first transparent base far away from the liquid crystal layer 13. The first polarizer 113 has a first light transmission axis. The first alignment film 111, the first electrode 112 and the color filter layer are arranged on an inner surface of the first transparent base facing the liquid crystal layer 13.

The first electrode 112 is provided with a plurality of stripe-like control electrodes 112a. The plurality of stripe-like control electrodes 112a of the first electrode 112 may be integrally formed and electrically connected together. For example, these stripe-like control electrodes 112a of the first electrode 112 may be integrally formed by patterning a conductive material layer. These stripe-like control electrodes 112a of the first electrode 112 are used for controlling a viewing angle of the LCD panel when a bias voltage is applied to the stripe-like control electrodes 112a of the first electrode 112.

Specifically, the second substrate 12 may be a thin film transistor (TFT) array substrate. The second substrate 12 may include a second transparent base (not shown), a second alignment film 121, a second electrode 122, a third electrode 123, an insulating layer 124, and a second polarizer 125. The second alignment film 121, the second electrode 122, the third electrode 123, the insulating layer 124 and the second polarizer 125 are formed on the second transparent base. The second polarizer 125 is arranged on an outer surface of the second transparent base far away from the liquid crystal layer 13. The second polarizer 125 has a second light transmission axis which is orthogonal to the first light transmission axis of the first polarizer 113. The second alignment film 121, the second electrode 122, the third electrode 123 and the insulating layer 124 are arranged on an inner surface of the second transparent base facing the liquid crystal layer 13, wherein the second electrode 122 and the third electrode 123 are insulated from each other by the insulating layer 124 disposed between the second electrode 122 and the third electrode 123.

The second electrode 122 is a common electrode used for inputting a common voltage (i.e., Vcom) from an IC (not shown) to the LCD panel, while the third electrode 123 is a pixel electrode which is formed in each pixel of the LCD panel. In the embodiment of FIG. 1, the second electrode 122 is disposed above the third electrode 123. The first electrode 112, the second electrode 122 and the third electrode 123 are preferred to be transparent, and may be made of Indium Tin Oxide (ITO), Indium Zinc Oxide (IZO) or the like.

In the embodiment of FIG. 1, the second electrode 122 is patterned to form a plurality of stripe-like electrodes 122a which are arranged in parallel to each other. The plurality of stripe-like electrodes 122a of the second electrode 122 may be integrally formed and electrically connected together. For example, these stripe-like electrodes 122a of the second electrode 122 may be integrally formed by patterning a conductive material layer. These stripe-like electrodes 122a of the second electrode 122 are used for inputting a common voltage (Vcom) from an IC such as a source driver IC (not shown) to the LCD panel. The third electrode 123 formed in each pixel of the LCD panel is a pixel electrode used for receiving data signals from a source driver IC for display. In the embodiment of FIG. 1, the third electrode 123 provided in each pixel of the LCD panel is a planar electrode without being patterned.

Figure 2:
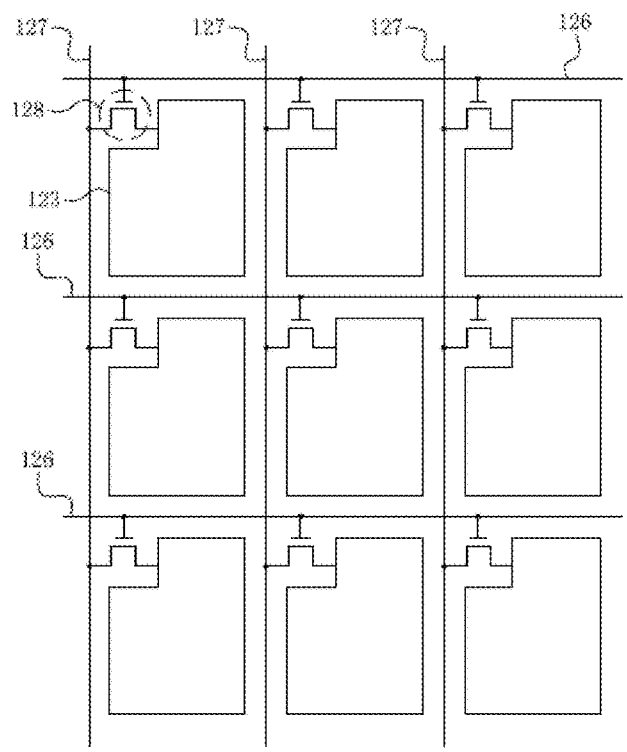
FIG. 2 schematically shows a circuit diagram of the LCD panel of FIG. 1.

FIG. 2 schematically shows a circuit diagram of the LCD panel of FIG. 1. Referring also to FIG. 2, the second substrate 12 may further include a plurality of scanning lines 126, a plurality of data lines 127 and a plurality of TFT 128 formed on the second transparent base, wherein the scanning lines 126 and the data lines 127 are intersected with each other to define a plurality of pixels for the LCD panel. The pixels are arranged in rows and columns to form a matrix. In each pixel, a pixel electrode (i.e., the third electrode 123) and a TFT 128 are provided therein. Typically, the TFT 128 has a gate electrode connected with a corresponding scanning line 126, a source electrode connected with a corresponding data line 127, and a drain electrode connected with the pixel electrode.

The liquid crystal layer 13 is provided with a plurality of liquid crystal molecules 131 which are sealed between the first alignment film 111 and the second alignment film 121. The first alignment film 111 and the second alignment film 121 may be made of polyimide (PI). The first alignment film 111 and the second alignment film 121 are used to align the liquid crystal molecules 131, so that the liquid crystal molecules 131 are oriented in predetermined directions. Each of the alignment films 111, 121 may be subjected to a rubbing treatment according to publicly known rubbing process. After the rubbing process, the first alignment film 111 is rubbed to have a first rubbing direction, the second alignment film 121 is rubbed to have a second rubbing direction. The liquid crystal molecules 131 adjacent to the first alignment film 111 are arranged and oriented along the first rubbing direction of the first alignment film 111, while the liquid crystal molecules 131 adjacent to the second alignment film 121 are arranged and oriented along the second rubbing direction of the second alignment film 121. The first rubbing direction and the second rubbing direction may be parallel to or crossed with an angle with each other.

Liquid crystal molecules are generally divided into positive liquid crystal molecules and negative liquid crystal molecules. In the present application, the liquid crystal molecules 131 of the liquid crystal layer 13 are positive liquid crystal molecules. In the initial state, the positive liquid crystal molecules 131 are preferred to be initially arranged in parallel to the principal surfaces of the substrates 11, 12, that is, the long axis of each of the positive liquid crystal molecules 131 is parallel to the principal surfaces of the substrate 11, 12. Since the alignment films 111, 121 have an anchoring effect to the liquid crystal molecules 131, the liquid crystal molecules 131 are arranged between the alignment films 111, 121 in parallel to the substrate 11, 12 under the anchoring effect. When an electric field is generated between the second electrode 122 and the third electrode 123 to cause the LCD panel to display, the positive liquid crystal molecules 131 will rotate in a plane parallel to the principal surfaces of the substrate 11, 12 until the long axis of the liquid crystal molecules 131 is arranged along the direction of the electric field.

Figure 3A:
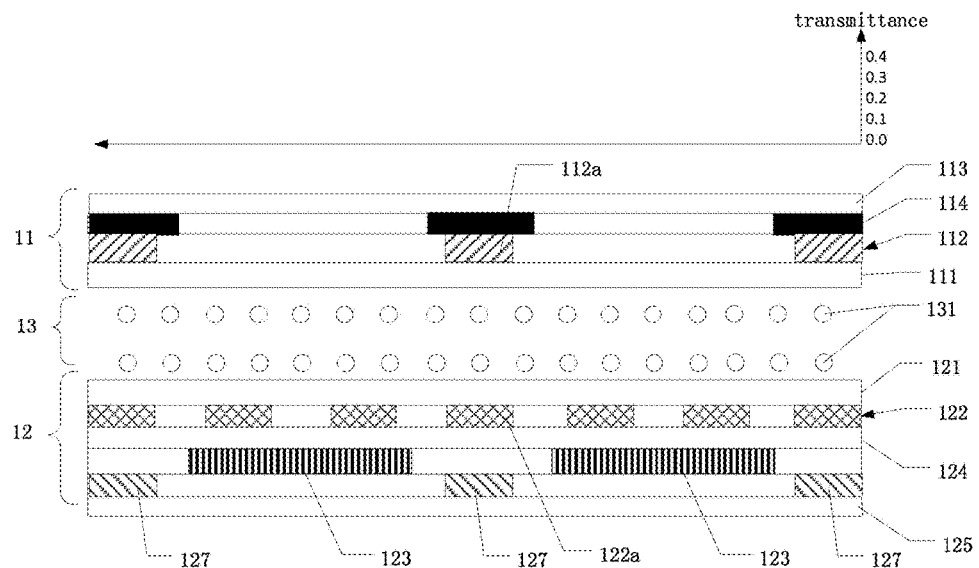
FIG. 3a shows the LCD panel of FIG. 1 when it is displayed in a dark state with a wide viewing angle.
Figure 3B:
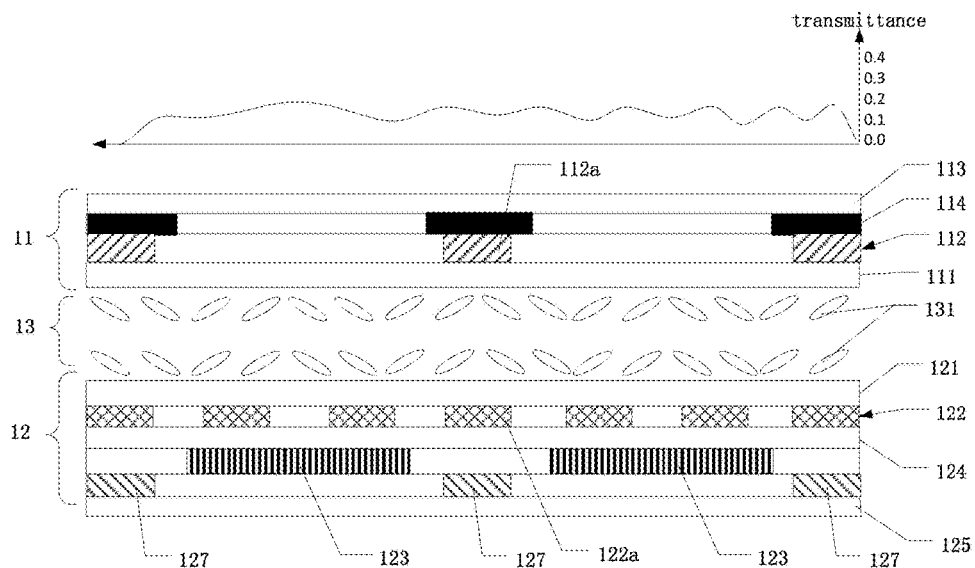
FIG. 3b shows the LCD panel of FIG. 1 when it is displayed in a bright state with a wide viewing angle.
Figure 3C:
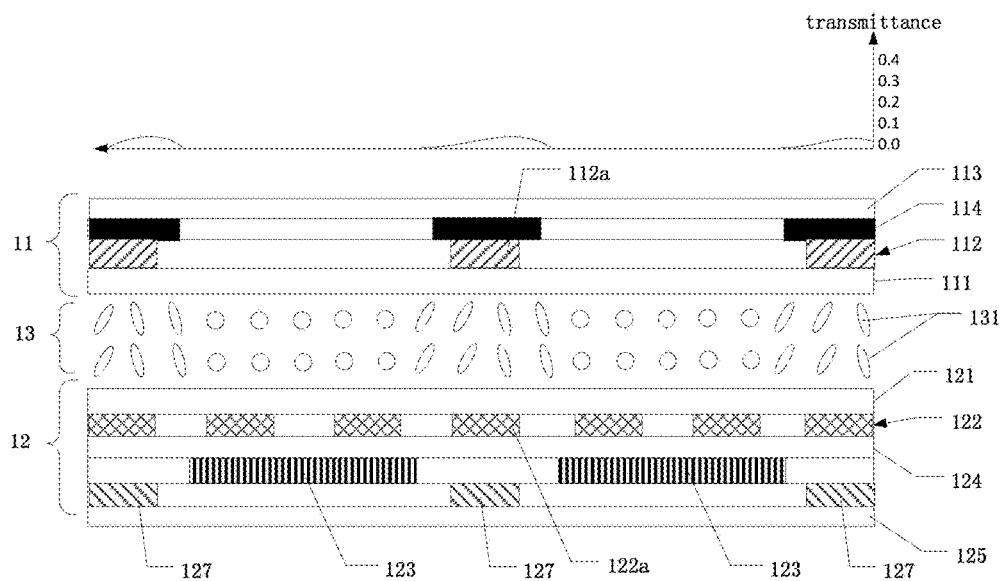
FIG. 3c shows the LCD panel of FIG. 1 when it is displayed in a dark state with a narrow viewing angle.
Figure 3D:
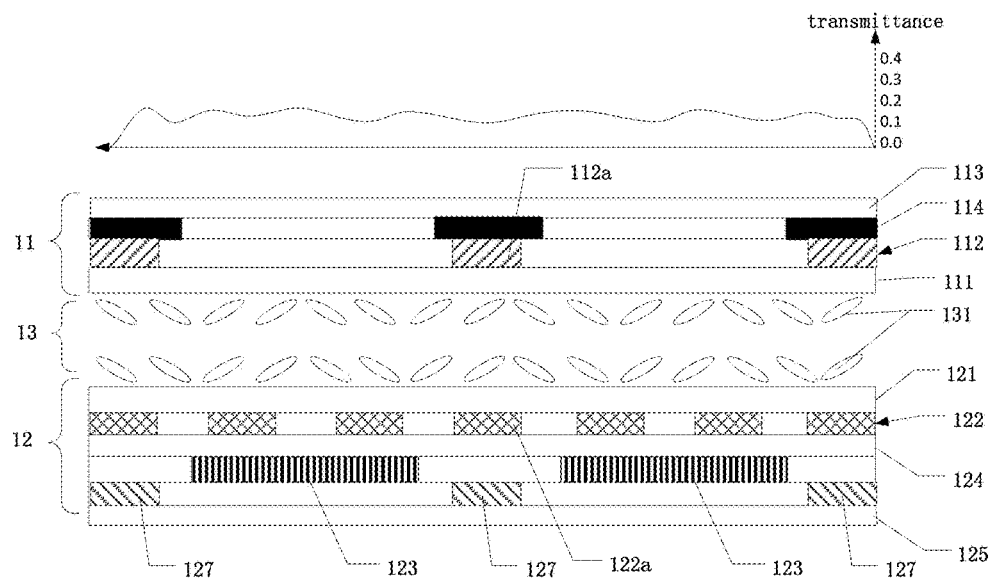
FIG. 3d shows the LCD panel of FIG. 1 when it is displayed in a bright state with a narrow viewing angle.

Referring to FIGS. 3a-3d, the LCD panel can be switched between a wide viewing angle and a narrow viewing angle. In FIGS. 3a-3b, the LCD panel is shown for display with a wide viewing angle when no bias voltage is applied to the first electrode 112. In FIGS. 3c-3d, the LCD panel is shown for display with a narrow viewing angle when a bias voltage is applied to the first electrode 112.

FIG. 3a shows the LCD panel when it is displayed in a dark state with a wide viewing angle. As shown in FIG. 3a, when no bias voltage is applied to the stripe-like control electrodes 112a of the first electrode 112, and no voltage signals are inputted to the second electrode 122 and the third electrode 123, the liquid crystal molecules 131 which are initially arranged in parallel to the substrate 11, 12 do not alter the transmission path of light from a backlight module (not shown), the light cannot pass through the second polarizer 125 and the first polarizer 113 (see the transmittance on the top of FIG. 3a), the LCD panel is thus displayed in a dark state.

FIG. 3b shows the LCD panel when it is displayed in a bright state with a wide viewing angle. As shown in FIG. 3b, when no bias voltage is applied to the stripe-like control electrodes 112a of the first electrode 112, but voltage signals are imputed to the second electrode 122 and the third electrode 123, a fringe electric field is generated between the second electrode 122 and the third electrode 123 to cause the liquid crystal molecules 131 in the liquid crystal layer 13 to rotate and the transmission path of the light is accordingly changed, then the light can pass through the second polarizer 125 and the first polarizer 113, the LCD panel is thus displayed in a bright state. The fringe electric field between the second electrode 122 and the third electrode 123 can ensure the light to pass through all the regions of the LCD panel with a certain brightness (see the transmittance on the top of FIG. 3b). Therefore, the LCD panel can achieve a wide viewing angle.

FIG. 3c shows the LCD panel when it is displayed in a dark state with a narrow viewing angle. As shown in FIG. 3c, when a bias voltage is applied to the stripe-like control electrodes 112a of the first electrode 112, and no voltage signals are inputted to the second electrode 122 and the third electrode 123, no fringe electric field is generated between the second electrode 122 and the third electrode 123. However, due to the bias voltage applied to the first electrode 112, a voltage difference will exist between the stripe-like control electrodes 112a of the first electrode 112 and the second electrode 122 (or the third electrode 123) to generate a vertical electric field along the vertical direction in particular areas corresponding to the stripe-like control electrodes 112a, and the liquid crystal molecules 131 aligned with the stripe-like control electrodes 112a are rotated under the action of the vertical electric field (see the change of arrangement of the liquid crystal molecules in FIG. 3c). As the liquid crystal molecules 131 under the respective stripe-like control electrodes 112a are rotated, a light leakage phenomenon is resulted as the transmission path of the light is partially changed in the areas corresponding to the stripe-like control electrodes 112a. It can be seen from the transmittance on the top of FIG. 3c, there is a light leakage near the respective stripe-like control electrodes 112a, the LCD panel is thus displayed in a dark state with light leakage in local areas.

FIG. 3*d* shows the LCD panel when it is displayed in a bright state with a narrow viewing angle. As shown in FIG. 3*d*, when a bias voltage is applied to the stripe-like control electrodes 112*a* of the first electrode 112, and voltage signals are inputted to the second electrode 122 and the third electrode 123, a fringe electric field is generated between the second electrode 122 and the third electrode 123, and due to the bias voltage applied to the stripe-like control electrodes 112*a* of the first electrode 112, a vertical electric field along the vertical direction is meanwhile existed between the stripe-like control electrodes 112*a* of the first electrode 112 and the second electrode 122 (or the third electrode 123) in the particular areas corresponding to the stripe-like control electrodes 112*a*. Thus, the liquid crystal molecules 131 in the liquid crystal layer 13 are rotated under a mixed electric field, i.e., the fringe electric field and the vertical electric field. The transmission path of the light is changed, the light can pass through the second polarizer 125 and the first polarizer 113, such that the LCD panel is displayed in a bright state. However, in this condition of FIG. 3*d*, since a light leakage phenomenon is generated in the areas corresponding to the stripe-like control electrodes 112*a* due to the applied bias voltage to the first electrode 112, the brightness and the contrast are reduced as compared with the case of FIG. 3*b* in which no bias voltage is applied to the first electrode 112. Thus, the viewing angle of the LCD panel is reduced correspondingly, to thereby achieve a narrow viewing angle.

The viewing angle of an LCD panel is mainly affected by the contrast of brightness between the bright state and the dark state. When a bias voltage is applied to the stripe-like control electrodes 112*a* of the first electrode 112, a light leakage is resulted. Thus, the contrast of brightness between the bright state and the dark state is decreased, and a viewing angle of the LCD panel is correspondingly reduced. Further, by controlling the magnitude of the bias voltage applied to the first electrode 112, the viewing angle of the LCD panel can be regulated. Specifically, the viewing angle of the LCD panel is reduced as the magnitude of the bias voltage applied to the first electrode 112 is increased. The bias voltage applied to the first electrode 112 generally should be smaller than the voltage signals provided to the second electrode 122 and the third electrode 123. Preferably, the bias voltage applied to the first electrode 112 is in the range of 0V to 4V. When no bias voltage is applied to the first electrode 112, the LCD panel is displayed with a wide viewing angle. When a bias voltage in the range of 0V~4V is applied to the first electrode 112, the LCD panel can display with a relatively narrow viewing angle, and by changing the magnitude of the bias voltage applied to the first electrode 112, the LCD panel can have different viewing angles.

It should be noted that, in the peripheral edge, the first substrate 11 and the second substrate 12 may be electrically connected together via an electrically conductive material such as gold balls, such that the bias voltage applied to the first electrode 112 of the first substrate 11 can be inputted from a printed circuit board (PCB) which is connected to the second substrate 12.

In the present application, the first substrate 11 is provided with a first electrode 112 having a plurality of stripe-like control electrodes 112*a*, while the second substrate 12 is provided a second electrode 122 acting as the common electrode and a third electrode 123 acting as the pixel electrode. When no bias voltage is applied to the first electrode 112, the LCD panel can realize a wide viewing angle, and the LCD panel can achieve a bright state or a dark state by controlling the voltage signals inputted to the second electrode 122 and the third electrode 123. When a bias voltage is applied to the first electrode 112, a vertical electric field is generated between the stripe-like control electrodes 112*a* and the second electrode 122 (or the third electrode 123) to cause light leakage near the respective stripe-like control electrodes 112*a*, whereby the contrast of brightness of the LCD panel between the bright state and the dark state is decreased to cause the viewing angle of the LCD panel to reduce, so that the LCD panel can realize a narrow viewing angle, and the LCD panel can achieve a bright state or a dark state by controlling the voltage signals inputted to the second electrode 122 and the third electrode 123. Further, when a bias voltage with different magnitudes is applied to the first electrode 112, the viewing angle of the LCD panel can be regulated to thereby obtain a more desirable narrow viewing angle as needed.

The stripe-like control electrodes 112*a* of the first electrode 112 can be made of a transparent conductive material such as ITO, IZO or a metal such Al, Mo. When the first electrode 112 is made of ITO, the transmittance of the LCD panel can be improved. When the first electrode 112 is made of metal, the resistance of the first electrode 112 can be reduced to thereby shorten the response time of the LCD panel.

As shown in FIG. 1, in the embodiment, the stripe-like control electrodes 112*a* of the first electrode 112 are arranged in parallel to and in alignment with the data lines 127, each stripe-like control electrode 112*a* is located above and aligned with a corresponding date line 127. Preferably, the stripe-like control electrodes 112*a* and the data lines 127 have the same number, that is, a stripe-like control electrode 112*a* is provided above and in alignment with each data line 127, and every two adjacent stripe-like control electrodes 112*a* are spaced from each other by a gap of a column of pixels.

In other embodiment, alternatively, the stripe-like control electrodes 112*a* of the first electrode 112 are arranged in parallel to and in alignment with the scanning lines 126, each stripe-like control electrode 112*a* is located above and aligned with a corresponding scanning line 126. Preferably, the stripe-like control electrodes 112*a* and the scanning lines 126 have the same number, that is, a stripe-like control electrode 112*a* is provided above and in alignment with each scanning line 126, and every two adjacent stripe-like control electrodes 112*a* are spaced from each other by a gap of a row of pixels.

As shown in FIG. 1, in the embodiment, the first substrate 11 may further include a black matrix (BM) 114 covering at a peripheral portion of each pixel of the LCD panel. The stripe-like control electrodes 112*a* of the first electrode 112 are located below and covered by the black matrix 114. Preferably, the stripe-like control electrodes 112*a* have a line width not greater than a line width of the black matrix 114, so that the stripe-like control electrodes 112*a* are aligned with and entirely covered by the black matrix 114. Thus, the aperture ratio (AR) of the LCD panel is not affected by the stripe-like control electrodes 112*a* of the first electrode 112, and the transmittance of the LCD panel is also not influenced.

When a user observes the LCD panel from the front, the user receives the light mainly from the center portion of each pixel; and when the user observes the LCD panel from a squint direction, the user receives the light mainly from the peripheral portion of each pixel. Therefore, in order to realize a narrow viewing angle, forming a light leakage at the peripheral portion of the pixels is enough to prevent the bystander from seeing the displayed content on the LCD panel. Accordingly, the stripe-like control electrodes 112a of the first electrode 112 are formed at the peripheral portion of the pixels. For example, the stripe-like control electrodes 112a can be extended along and aligned with the data lines 127 of the second substrate 12 (as shown in FIG. 1), or alternatively, the stripe-like control electrodes 112a can be extended along and aligned with the scanning lines 126 of the second substrate 12. Further, the stripe-like control electrodes 112a are covered by the black matrix 114. As a result, the stripe-like control electrodes 112a are arranged at the peripheral portion of the pixels, the bias voltage applied to the stripe-like control electrodes 112a can cause a light leakage mainly at the peripheral portion of the pixels, and the light in the center portion of the pixels is not affected. Therefore, when the LCD panel is observed from a narrow viewing angle, the brightness of the LCD panel is not affected.

Figure 4:
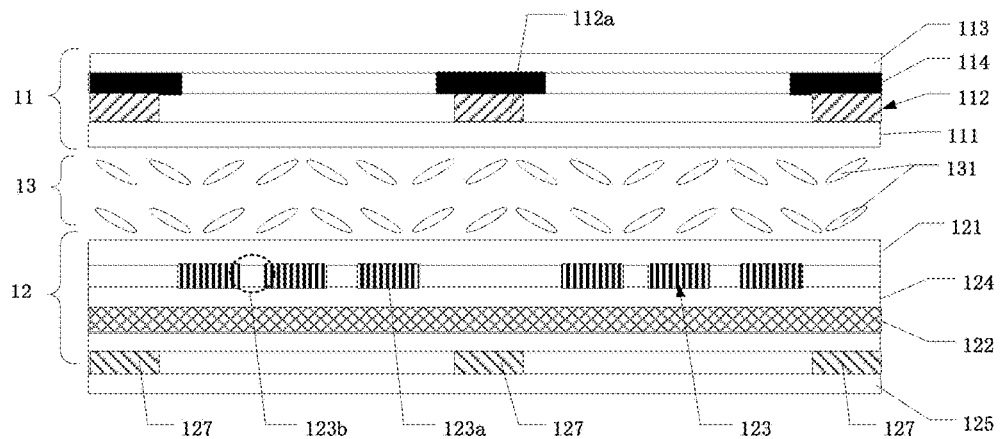
FIG. 4 schematically shows a sectional view of an LCD panel according to a second embodiment of the present application.

FIG. 4 schematically shows a sectional view of an LCD panel according to a second embodiment of the present application. As shown in FIG. 4, the LCD panel of FIG. 4 differs from the LCD panel of FIG. 1 in that the second electrode 122 (i.e., common electrode) is disposed below the third electrode 123 (i.e., pixel electrode), the second electrode 122 is a planar electrode across the second substrate 12 without being patterned, and the third electrode 123 formed in each pixel is patterned to form a plurality of stripe-like electrodes 123a with a slit 123b existed between two adjacent stripe-like electrodes 123a. Other structures of the LCD panel of FIG. 4 are the same as the LCD panel of FIG. 1, and omitted herein for clarity.

Figure 5:
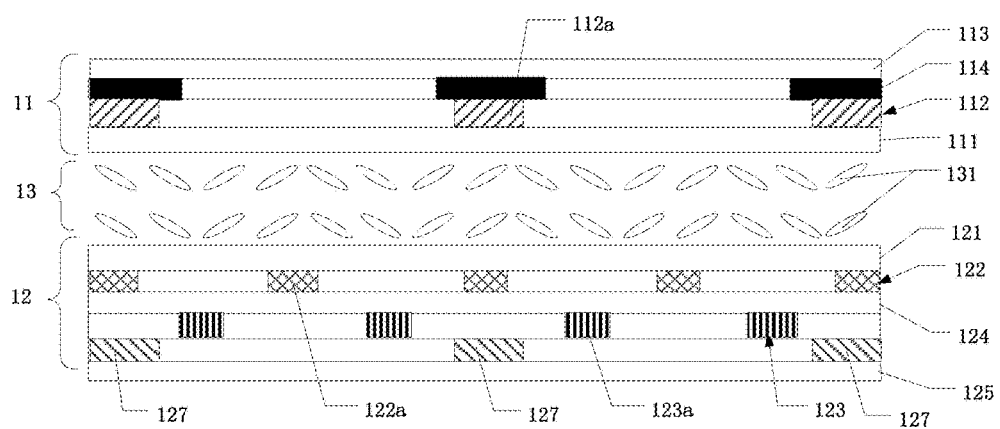
FIG. 5 schematically shows a sectional view of an LCD panel according to a third embodiment of the present application.

FIG. 5 schematically shows a sectional view of an LCD panel according to a third embodiment of the present application. As shown in FIG. 5, the LCD panel of FIG. 5 differs from the LCD panel of FIG. 1 in that the third electrode 123 formed in each pixel is patterned to form a plurality of stripe-like electrodes 123a. The stripe-like electrodes 122a of the second electrode 122 (i.e., common electrode) and the stripe-like electrodes 123a of the third electrode 123 (i.e., pixel electrode) are alternately arranged with each other. The second electrode 122 may be disposed above the third electrode 123 (FIG. 5), or alternatively, the second electrode 122 can be disposed below the third electrode 123 (not shown). Other structures of the LCD panel of FIG. 5 are the same as the LCD panel of FIG. 1, and omitted herein for clarity.

Figure 6:
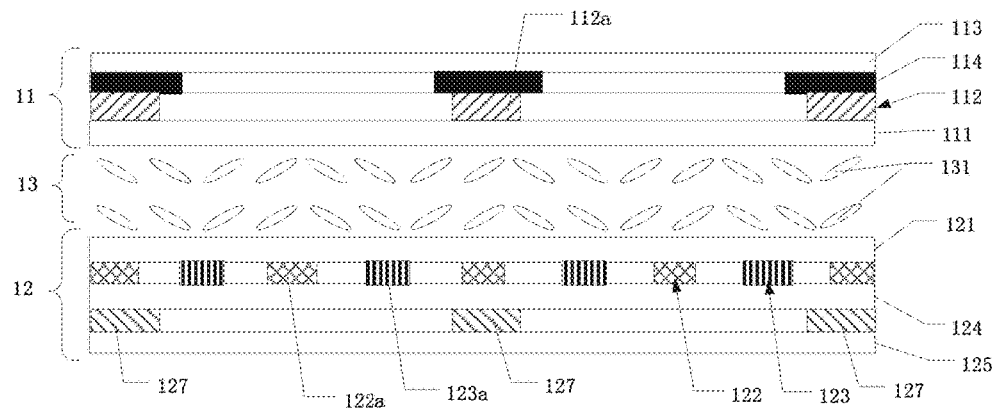
FIG. 6 schematically shows a sectional view of an LCD panel according to a fourth embodiment of the present application.

FIG. 6 schematically shows a sectional view of an LCD panel according to a fourth embodiment of the present application. As shown in FIG. 6, the LCD panel of FIG. 6 differs from the LCD panel of FIG. 1 in that the second electrode 122 (i.e., common electrode) and the third electrode 123 (i.e., pixel electrode) are arranged in the same layer, the second electrode 122 is patterned to form a plurality of stripe-like electrodes 122a, the third electrode 123 formed in each pixel is patterned to form a plurality of stripe-like electrodes 123a, the stripe-like electrodes 122a of the second electrode 122 and the stripe-like electrodes 123a of the third electrode 123 are alternately arranged with each other. Other structures of the LCD panel of FIG. 6 are the same as the LCD panel of FIG. 1, and omitted herein for clarity.

In different embodiments of the present application, the second electrode 122 (i.e., common electrode) is preferred to be a planar electrode across the second substrate 12 without being patterned. The planar common electrode can generate a stronger fringe electric field together with the pixel electrode to achieve a higher light transmittance and thereby obtain a higher brightness and a better display quality.

Preferably, the first substrate 11 is separated from the second substrate 12 by a gap of about 4 um. That is, the LCD panel has a cell gap of about 4 um. When the cell gap is notably smaller than 4 um, a light leakage will happen and the LCD panel will have a relatively low brightness in a narrow viewing angle to affect the display quality. When the cell gap is notably greater than 4 um, the LCD panel will have a prolonged response time when switched between a bright state and a dark state.

Figure 7A:
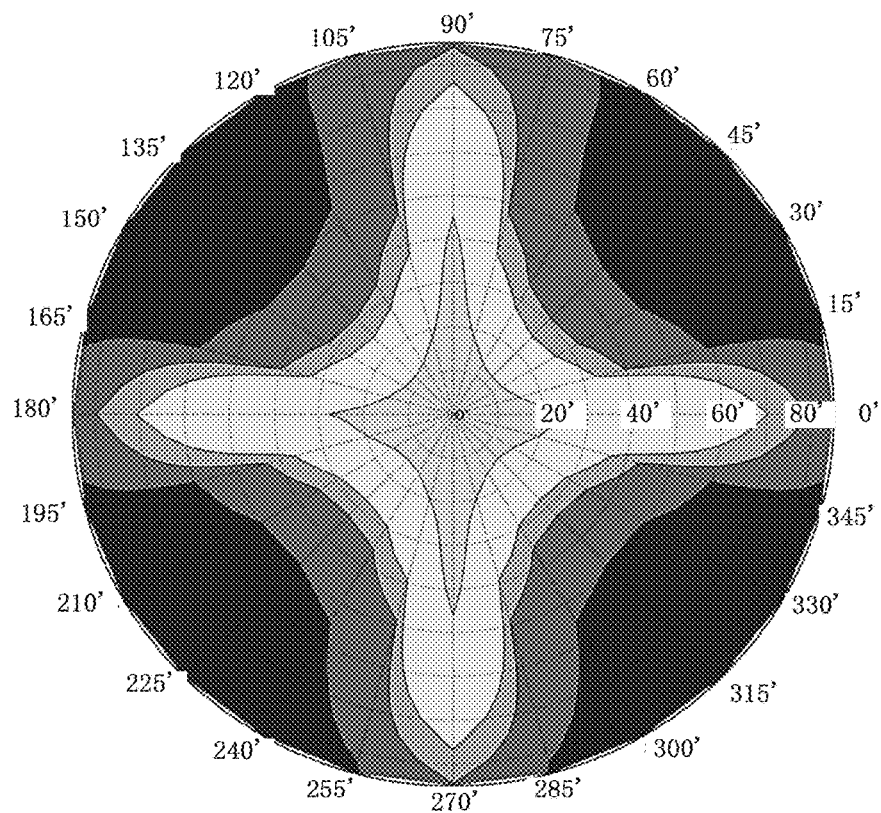
FIG. 7a shows the simulation result of viewing angle of the LCD panel of FIG. 1 when it is displayed with a wide viewing angle.

FIG. 7a shows the simulation result of viewing angle of the LCD panel of FIG. 1 when the LCD panel has a cell gap of 4 um and no bias voltage is applied to the first electrode 112. As can be seen from FIG. 7a, when no bias voltage is applied to the first electrode 112, the LCD panel has a viewing angle from about −85 degrees to about 85 degrees both in the horizontal direction and in the vertical direction, which can meet the display requirement with a wide viewing angle.

Figure 7B:
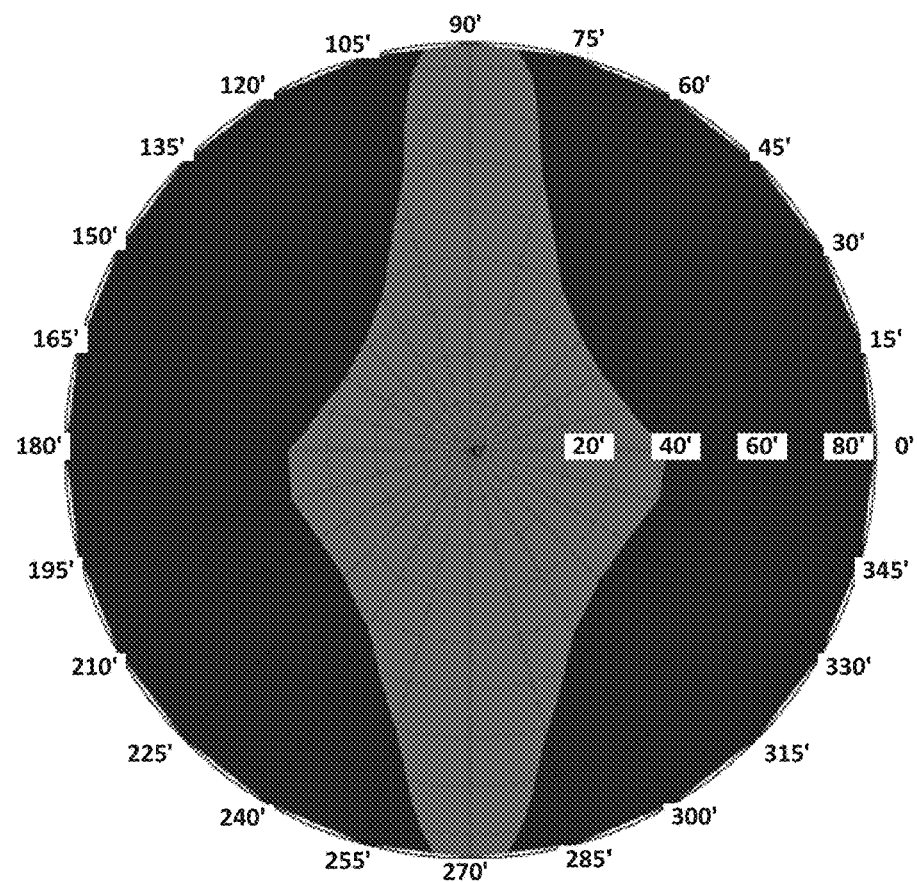
FIG. 7b shows the simulation result of viewing angle of the LCD panel of FIG. 1 when it is displayed with a narrow viewing angle.

FIG. 7b shows the simulation result of viewing angle of the LCD panel of FIG. 1 when the LCD panel has a cell gap of 4 um and a bias voltage of 3V is applied to the first electrode 112. As can be seen from FIG. 7b, when the first electrode 112 is applied with a bias voltage of 3V, the LCD panel has a viewing angle from about −40 degrees to about 35 degrees in the horizontal direction, which can meet the display requirement with a narrow viewing angle.

Figure 8:
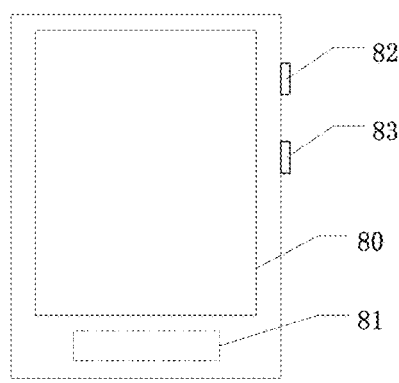
FIG. 8 schematically shows a plan view of an LCD according to a fifth embodiment of the present application.

In another aspect, the present application further provides an LCD as schematically shown in FIG. 8, the LCD includes an LCD panel 80 and a driver IC 81 electrically connected with the LCD panel 80 for driving the LCD panel 80, wherein the LCD panel 80 is one of the LCD panels as described above. The LCD may be used in an electronic device such as a notebook computer, a personal digital assistant (PDA), a tablet PC, a mobile phone, a digital camera, etc.

Due to the LCD being incorporated with the above-mentioned LCD panel, the LCD can achieve the same effect as the above-mentioned LCD panel.

In the embodiment, the bias voltage applied to the first electrode 112 is provided by the driver IC 81 of the LCD. Further, the driver IC 81 can regulate and control the bias voltage applied to the first electrode 112, so as to regulate the viewing angle of the LCD panel 80. Therefore, the LCD panel 80 can further be provided with a control button 82 for controlling the viewing angle of the LCD panel 80. The control button 82 can be set with one or two in number. When only one control button 82 is provided as shown in FIG. 8, the LCD can realize a narrow viewing angle when the control button 82 is pressed, in which case no bias voltage is applied to the first electrode 112 by the driver IC 81, and the LCD can realize a wide viewing angle when the control button 82 is pressed again, in which case a bias voltage with predetermined value is applied to the first electrode 112 by the driver IC 81. In addition, when two control buttons 82 are provided, the LCD can realize a narrow viewing angle when one of the control buttons 82 is pressed, in which case no bias voltage is applied to the first electrode 112 by the driver IC 81, and the LCD can realize a wide viewing angle when the other one of the control buttons 82 is pressed, in which case a bias voltage with predetermined value is applied to the first electrode 112 by the driver IC 81. It should be noted that, the control button 82 can be a physical solid button formed on the LCD panel 80 or a virtual button with its function being executed by firmware or software.

Moreover, the LCD panel 80 can further be provided with an input key 83. Through the input key 83, a user can preset a specific value of the bias voltage (e.g., a value in the range of 0V~4V) that is intended to be applied to the first electrode 112 of the first substrate 11 when the LCD panel 80 is switched to a narrow viewing angle display mode, so as to obtain a more desirable viewing angle as needed.

In a further aspect, a method of controlling a viewing angle of the LCD panel is provided. The method includes the steps: when the LCD panel is required to display with a wide viewing angle, applying no bias voltage to the first electrode 112; and when the LCD panel is required to display with a narrow viewing angle, applying a bias voltage to the first electrode 112. Preferably, the bias voltage applied to the first electrode 112 is in the range of 0V to 4V. As the magnitude of the bias voltage applied to the first electrode 112 is increased, the viewing angle of the LCD panel is reduced.

From the above, the first substrate 11 of the LCD panel is provided with a plurality of stripe-like control electrodes 112a, by applying and controlling the bias voltage applied to the stripe-like control electrodes 112a, the viewing angle of the LCD panel is effectively regulated. Thus, the LCD panel can switch between a wide viewing angle and a narrow viewing angle as the viewing angle of the LCD panel is regulated and controlled to meet the requirement of protecting privacy in public places. It is not required to use a louver shielding film or provide a dual light source backlight system in the LCD, without increasing the thickness and the cost of the LCD and having the advantages of easy operation and good flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) panel, comprising:
   a first substrate being provided with a first electrode, wherein the first electrode is provided with a plurality of stripe-like control electrodes for controlling a viewing angle of the LCD panel;
   a second substrate being provided with a second electrode and a third electrode, wherein the second electrode is a common electrode for inputting a common voltage to the LCD panel and the third electrode is a pixel electrode formed in each pixel of the LCD panel; and
   a liquid crystal layer being sealed between the first substrate and the second substrate;
   wherein when no bias voltage is applied to the stripe-like control electrodes of the first electrode, the LCD panel is displayed with a wide viewing angle; and when a bias voltage is applied to the stripe-like control electrodes of the first electrode to generate a vertical electric field between the first substrate and the second substrate in the areas corresponding to the stripe-like control electrodes of the first electrode, the LCD panel is displayed with a narrow viewing angle.

2. The LCD panel of claim 1, wherein the stripe-like control electrodes of the first electrode are integrally formed and electrically connected together.

3. The LCD panel of claim 1, wherein the liquid crystal layer is provided with a plurality of liquid crystal molecules, the liquid crystal molecules are positive liquid crystal molecules, and the liquid crystal molecules are initially arranged substantially in parallel to the first and second substrates.

4. The LCD panel of claim 1, wherein the second substrate further comprises a plurality of scanning lines and a plurality of data lines, the scanning lines and the data lines are intersected with each other to define a plurality of pixels, and the pixels are arranged in rows and columns.

5. The LCD panel of claim 4, wherein the stripe-like control electrodes of the first electrode are arranged in parallel to and in alignment with the data lines, each stripe-like control electrode is located above and aligned with a corresponding date line.

6. The LCD panel of claim 5, wherein the stripe-like control electrodes and the data lines have the same number, a stripe-like control electrode is provided above and in alignment with each data line, and every two adjacent stripe-like control electrodes are spaced from each other by a gap of a column of pixels.

7. The LCD panel of claim 4, wherein the stripe-like control electrodes of the first electrode are arranged in parallel to and in alignment with the scanning lines, each stripe-like control electrode is located above and aligned with a corresponding scanning line.

8. The LCD panel of claim 7, wherein the stripe-like control electrodes and the scanning lines have the same number, a stripe-like control electrode is provided above and in alignment with each scanning line, and every two adjacent stripe-like control electrodes are spaced from each other by a gap of a row of pixels.

9. The LCD panel of claim 1, wherein the first substrate further comprises a black matrix, the stripe-like control electrodes of the first electrode are located below and covered by the black matrix.

10. The LCD panel of claim 9, wherein the stripe-like control electrodes have a line width not greater than a line width of the black matrix, and the stripe-like control electrodes are aligned with and entirely covered by the black matrix.

11. The LCD panel of claim 1, wherein the first substrate is a color filter substrate, the second substrate is a thin film transistor array substrate.

12. The LCD panel of claim 11, wherein the second electrode is disposed above the third electrode, or the second electrode is disposed below the third electrode.

13. The LCD panel of claim 11, wherein the second electrode is patterned to form a plurality of stripe-like electrodes, the third electrode formed in each pixel of the LCD panel is a planar electrode without being patterned.

14. The LCD panel of claim 11, wherein the second electrode is a planar electrode across the second substrate without being patterned, the third electrode formed in each pixel is patterned to form a plurality of stripe-like electrodes.

15. The LCD panel of claim 11, wherein the second electrode is patterned to form a plurality of stripe-like electrodes, the third electrode formed in each pixel is patterned to form a plurality of stripe-like electrodes, the stripe-like electrodes of the second electrode and the stripe-like electrodes of the third electrode are alternately arranged with each other.

16. The LCD panel of claim 11, wherein the second electrode and the third electrode are arranged in the same layer, the second electrode is patterned to form a plurality of stripe-like electrodes, the third electrode formed in each pixel is patterned to form a plurality of stripe-like electrodes, the stripe-like electrodes of the second electrode and the stripe-like electrodes of the third electrode are alternately arranged with each other.

17. An LCD (liquid crystal display), comprising:
   an LCD panel of claim 1; and a driver IC electrically connected with the LCD panel for driving the LCD panel.

18. The LCD of claim 17, wherein the LCD panel is provided with a control button for controlling the viewing angle of the LCD panel.

19. A method of controlling a viewing angle of the LCD panel of claim 1, comprising the steps:
   when the LCD panel is required to display with a wide viewing angle, applying no bias voltage to the stripe-like control electrodes of the first electrode;
   when the LCD panel is required to display with a narrow viewing angle, applying a bias voltage to the stripe-like control electrodes of the first electrode.

20. The method of claim 19, wherein the bias voltage applied to the first electrode is in the range of 0V to 4V.

* * * * *